US 11,118,576 B2

United States Patent
Okazaki et al.

(10) Patent No.: US 11,118,576 B2
(45) Date of Patent: Sep. 14, 2021

(54) THERMAL ACTUATOR, AND THERMAL ACTUATOR UNIT

(71) Applicant: Japan Aerospace Exploration Agency, Tokyo (JP)

(72) Inventors: Shun Okazaki, Tokyo (JP); Hiroyuki Ogawa, Tokyo (JP)

(73) Assignee: JAPAN AEROSPACE EXPLORATION AGENCY

( * ) Notice: Subject to any disclaimer, the term of this patent is extended or adjusted under 35 U.S.C. 154(b) by 0 days.

(21) Appl. No.: 16/626,928

(22) PCT Filed: Jul. 10, 2018

(86) PCT No.: PCT/JP2018/026059
§ 371 (c)(1),
(2) Date: Dec. 27, 2019

(87) PCT Pub. No.: WO2019/013209
PCT Pub. Date: Jan. 17, 2019

(65) Prior Publication Data
US 2020/0132057 A1    Apr. 30, 2020

(30) Foreign Application Priority Data
Jul. 14, 2017 (JP) .............................. JP2017-138367

(51) Int. Cl.
*F03G 7/06* (2006.01)
(52) U.S. Cl.
CPC .................................. *F03G 7/065* (2013.01)

(58) Field of Classification Search
CPC .......... F03G 7/065; G01K 5/483; G12B 31/00
See application file for complete search history.

(56) References Cited

U.S. PATENT DOCUMENTS

| 4,806,815 A * | 2/1989 | Honma .................... F03G 7/065 310/307 |
| 6,404,636 B1 | 6/2002 | Staggers et al. .............. 361/704 |
| 2004/0035108 A1* | 2/2004 | Szilagyi ................. B25J 9/1085 60/528 |
| 2007/0216194 A1* | 9/2007 | Rober .................... B62D 37/02 296/180.1 |
| 2011/0175474 A1* | 7/2011 | Brown .................... F16D 28/00 310/78 |

FOREIGN PATENT DOCUMENTS

JP    57-133212 U    8/1982
JP    03-047480 A    2/1991
(Continued)

OTHER PUBLICATIONS

JP-05259667-A English Translation (Year: 1993).*
(Continued)

*Primary Examiner* — Shafiq Mian
(74) *Attorney, Agent, or Firm* — Ostrolenk Faber LLP

(57) ABSTRACT

A thermal actuator unit of the present invention includes a first member, a second member, an elastic part which is disposed between the first member and the second member, and a thermal deformation part which is disposed on a side of the first member opposite to a side with the second member and has a shape-memory alloy to be deformed to the side with the second member due to heat.

8 Claims, 8 Drawing Sheets

(56) References Cited

FOREIGN PATENT DOCUMENTS

| JP | 04-099888 U | | 8/1992 |
|----|-------------|---|--------|
| JP | 05-259667 A | | 10/1993 |
| JP | 05259667 A | * | 10/1993 |
| JP | 08-278099 A | | 10/1996 |
| JP | 5003167 B2 | | 8/2012 |
| JP | 2013-243365 A | | 12/2013 |
| JP | 2016-532069 A | | 10/2016 |
| WO | WO 2015/042398 A1 | | 3/2015 |

OTHER PUBLICATIONS

International Search Report dated Oct. 2, 2018 in corresponding PCT International Application No. PCT/JP2018/026059.
Written Opinion dated Oct. 2, 2018 in corresponding PCT International Application No. PCT/JP2018/026059.
David G. Gilmore, "Spacecraft Thermal Control Handbook Volume I: Fundamental Technologies," The Aerospace Corporation, 2002, pp. 353-371.

* cited by examiner

THERMAL ACTUATOR, AND THERMAL ACTUATOR UNIT

CROSS-REFERENCE TO RELATED APPLICATIONS

The present application is a 35 U.S.C. §§ 371 national phase conversion of PCT/JP2018/026059, filed Jul. 10, 2018, which claims priority to Japanese Patent Application No. 2017-138367, filed Jul. 14, 2017, the contents of which are incorporated herein by reference. The PCT International Application was published in the Japanese language.

TECHNICAL FIELD

The present invention relates to a thermal actuator and a thermal actuator unit.

BACKGROUND ART

In order to suppress an excessive temperature rise in heating elements such as electronic instruments, the heating element and a heat exchanger are switched to either a contact state or a non-contact state using a thermal actuator which is operated in accordance with a change in thermal environment. For example, in a spacecraft used in outer space where the thermal environment changes significantly, there is a need to provide a heat exchanger for releasing heat generated in electronic instruments to the outside in order to avoid an excessively high temperature inside the spacecraft and to warm the inside of the spacecraft using a heater in order to maintain a constant temperature inside the spacecraft under a low-temperature environment. In a spacecraft, the amount of power consumed by a heater is reduced using a thermal actuator by causing electronic instruments and a heat exchanger to be in a non-contact state in a low-temperature state and causing the electronic instruments and the heat exchanger to be in a contact state in a high-temperature state.

Non-Patent Literature 1 discloses a thermal actuator (heat switch) utilizing a volume change in solid-liquid phases of paraffin.

Patent Literature 1 discloses a thermal actuator (heat dissipation switch) using a shape-memory alloy. The heat dissipation switch disclosed in Patent Literature 1 has a constitution in which the heat dissipation switch is provided between a heating element and a heat exchanger such that a heat flow path between the heating element and the heat exchanger is generated or eliminated in accordance with deformation of the shape-memory alloy.

CITATION LIST

Non-Patent Literature

[Non-Patent Literature 1]
Written by David G. Gilmore, "Spacecraft Thermal Control Handbook Volume I: Fundamental Technologies", The Aerospace Corporation, published in 2002, p. 353-371

Patent Literature

[Patent Literature 1]
Japanese Unexamined Patent Application, First Publication No. 2013-243365

SUMMARY OF INVENTION

Technical Problem

A thermal actuator disclosed in Non-Patent Literature 1, in which a volume change in solid-liquid phase of paraffin is utilized, requires a container for enclosing paraffin. Therefore, it tends to have a large size and to be increased in mass.

In addition, in a thermal actuator disclosed in Patent Literature 1, in which a shape-memory alloy is used, a heating element and a heat exchanger are brought into contact with each other with the shape-memory alloy interposed therebetween. Therefore, it is difficult to increase a contact area between the heating element and the heat exchanger. In addition, a coefficient of heat transfer deteriorates due to the interposed shape-memory alloy.

The present invention has been made in consideration of the foregoing circumstances, and an object thereof is to provide a thermal actuator unit that has a constitution in which a size and a weight are easily reduced and a support plate of a heat exchanger or the like and a movable plate serving as a heating element can be brought into contact with each other over a wide area, and a thermal actuator that can be advantageously used as a drive source of the thermal actuator unit.

Solution to Problem

In order to resolve the foregoing task, according to an aspect of the present invention, there is provided a thermal actuator unit including a first member, a second member, an elastic part which is disposed between the first member and the second member, and a thermal deformation part which is disposed on a side of the first member opposite to a side with the second member and has a shape-memory alloy to be deformed to the side with the second member due to heat.

According to the aspect of the present invention, in the thermal actuator unit, the shape-memory alloy may be extensionally deformable in a direction along a direction perpendicular to a surface of the second member due to heat. The thermal actuator unit may further include a strut which extends in the direction perpendicular to the surface of the second member and in which one end portion is fixed to the surface of the second member and a flange portion is provided in the other end portion. The first member may have a penetration hole through which the strut passes and may be slidable along the strut.

In addition, according to the aspect of the present invention, in the thermal actuator unit, the thermal deformation part may include a plurality of columnar shape-memory alloy bodies, and the plurality of columnar bodies may be individually disposed in a circumferential direction of the strut.

In addition, according to the aspect of the present invention, in the thermal actuator unit, the plurality of columnar bodies may be covered with a thermally conductive part.

In addition, according to the aspect of the present invention, in the thermal actuator unit, the strut may be a bolt having a male screw, and the second member may have a female screw on the surface and may have a tightening torque adjusting part used when the male screw of the bolt and the female screw of the second member are screwed to each other.

In addition, according to the aspect of the present invention, in the thermal actuator unit, the elastic part may be a disk spring, and the strut may be inserted into a hole of the disk spring.

In addition, according to the aspect of the present invention, in the thermal actuator unit, the shape-memory alloy may be a single-crystalline shape-memory alloy.

In addition, according to the aspect of the present invention, in the thermal actuator unit, an elastic part accommodation hole may be formed on at least one of a surface of the first member on the side with second member and a surface of the second member on a side with the first member.

According to another aspect of the present invention, there is provided a thermal actuator including an elastic part which is disposed between a first member and a second member, and a thermal deformation part which is disposed on a side of the first member opposite to the side with second member and has a shape-memory alloy to be deformed to the side with second member due to heat.

According to the aspect of the present invention, the thermal actuator may further include a strut, one end portion of which is fixable to a surface of the second member, and a flange portion is provided in an other end portion of the strut. The elastic part and the thermal deformation part may have a penetration hole through which the strut passes, and the shape-memory alloy may be extensionally deformable in a direction along a longitudinal direction of the strut due to heat.

Advantageous Effects of Invention

According to the present invention, it is possible to provide a thermal actuator unit that has a constitution in which a size and a weight are easily reduced and a support plate of a heat exchanger or the like and a movable plate serving as a heating element can be brought into contact with each other over a wide area, and a thermal actuator that can be advantageously used as a drive source of the thermal actuator unit.

DESCRIPTION OF EMBODIMENTS

Figure 1A:
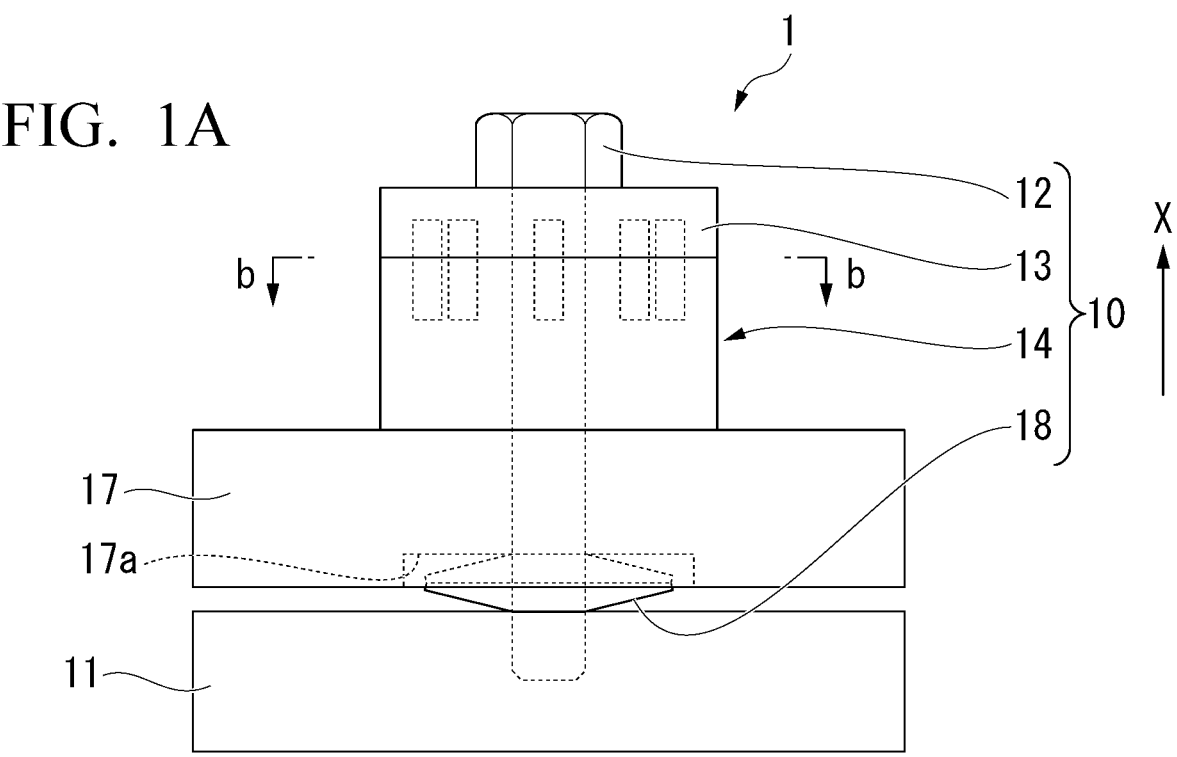
FIG. 1A is a view describing a constitution of a thermal actuator unit according to a first embodiment of the present invention and is a front view of the thermal actuator unit.

Hereinafter, embodiments of a thermal actuator and a thermal actuator unit of the present invention will be described with reference to the accompanying drawings. In the following description, in the thermal actuator unit, a second member serves as a support plate, and a first member serves as a movable plate which can be displaced in a direction perpendicular to a surface of the support plate. In the drawings used in the following description, in order to facilitate understanding of characteristics of the present invention, there are cases where characteristic parts are illustrated in an enlarged manner for convenience, and the dimensional ratio or the like of each of constituent elements may be different from the actual ratio or the like.

First Embodiment

Figure 1B:
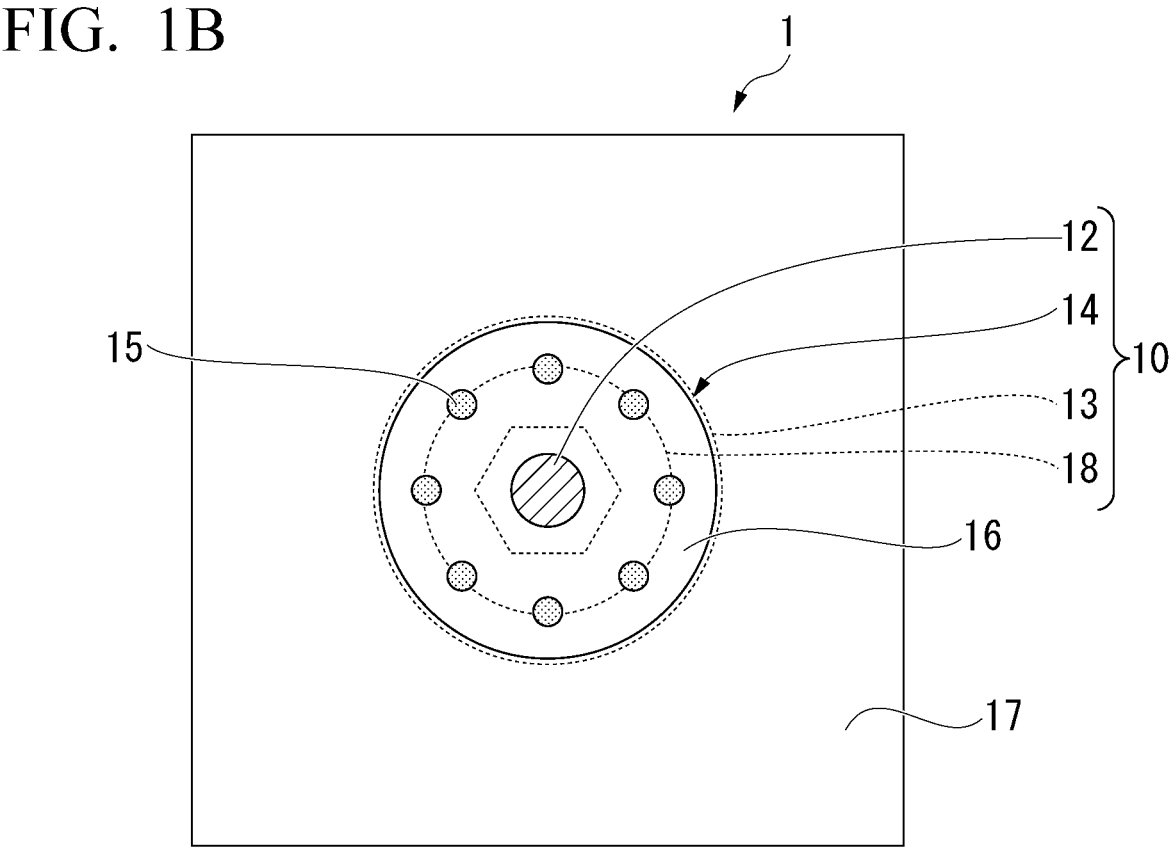
FIG. 1B is a cross-sectional view taken along line b-b in FIG. 1A.
Figure 2A:
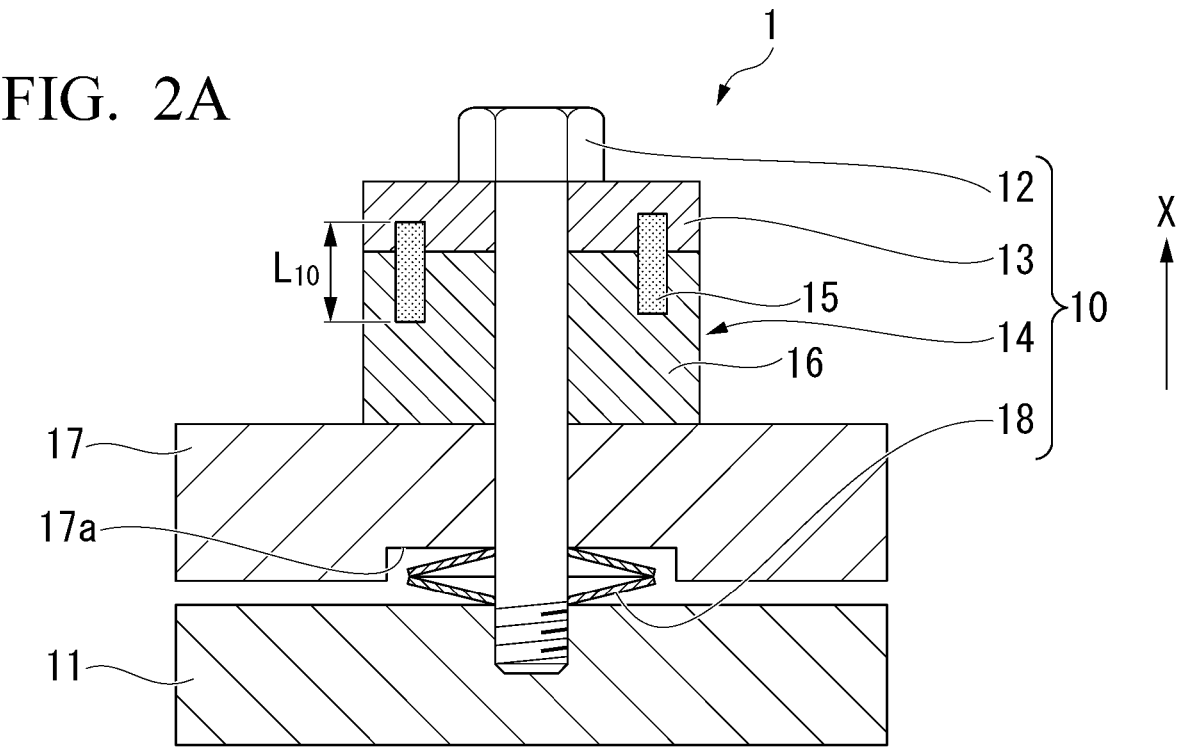
FIG. 2A is a view describing an operation state of the thermal actuator unit according to the first embodiment of the present invention and is a front cross-sectional view of the thermal actuator unit before operation.
Figure 2B:
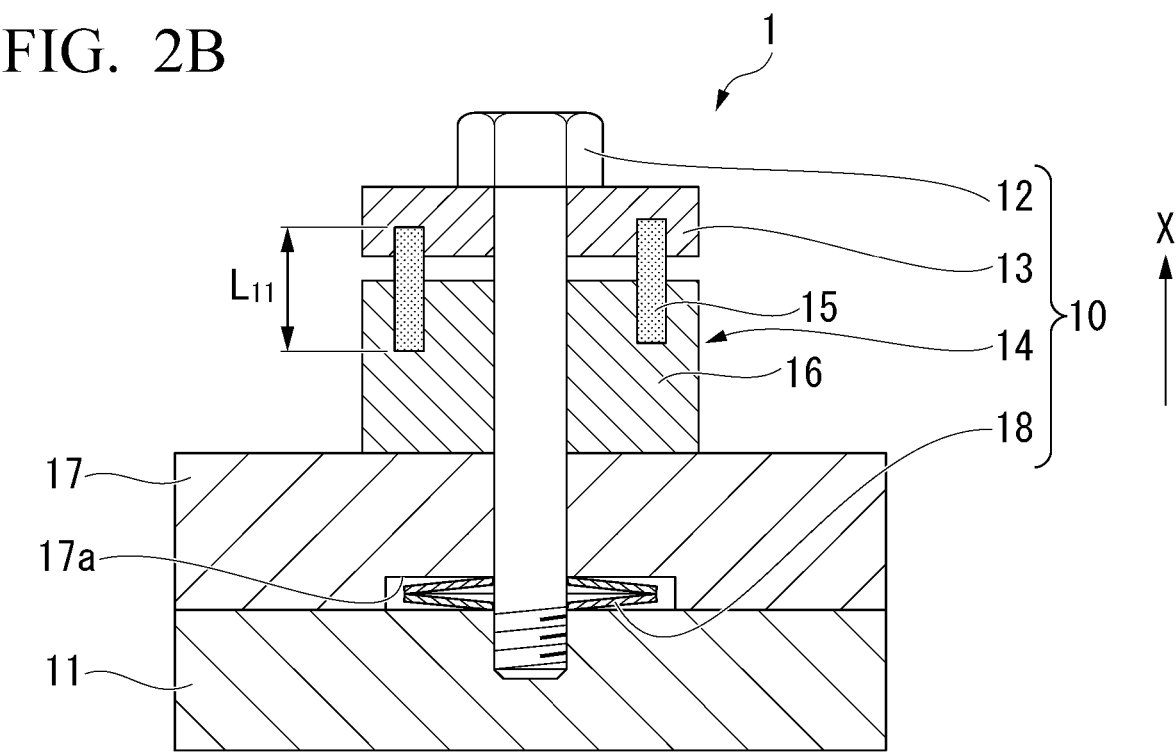
FIG. 2B is a view describing an operation state of the thermal actuator unit according to the first embodiment of the present invention and is a front cross-sectional view of the thermal actuator unit after operation.

FIGS. 1A and 1B are views describing a constitution of a thermal actuator unit according to a first embodiment of the present invention. FIG. 1A is a front view of the thermal actuator unit, and FIG. 1B is a cross-sectional view taken along line b-b in FIG. 1A. FIGS. 2A and 2B are views describing operation states of the thermal actuator unit according to the first embodiment of the present invention. FIG. 2A is a front cross-sectional view of the thermal actuator unit before operation, and FIG. 2B is a front cross-sectional view of the thermal actuator unit after operation.

A thermal actuator unit 1 according to the first embodiment includes a support plate 11, a strut 12, a thermal deformation part 14, a movable plate 17, and an elastic part 18. A thermal actuator 10 is a drive source for causing the movable plate 17 to be displaced in a direction perpendicular to a surface of the support plate 11. The thermal actuator 10 includes the strut 12, the thermal deformation part 14, and the elastic part 18.

The support plate 11 is a part which becomes a base part of the thermal actuator unit 1, and it is possible to suitably select a material or a structure depending on the purpose of the thermal actuator unit 1. For example, the support plate 11 can serve as a heat exchanger. For example, a radiator or a heat sink can be used as the heat exchanger.

The strut 12 extends in the direction perpendicular to the surface of the support plate 11. One end portion is fixed to the surface of the support plate 11, and a flange portion 13 is provided in the other end portion. In the present embodiment, the strut 12 is a bolt having a male screw, and the support plate 11 has a female screw on the surface. The strut 12 is fixed to the surface of the support plate 11 by screwing the male screw of the bolt and the female screw of the support plate 11 to each other. In the present embodiment, the strut 12 constitutes a male screw in only a part screwed to the support plate 11. However, the entire surface of the strut 12 may constitute a male screw. As an example of a material of the strut 12, it is possible to utilize a material such as a metal, a ceramic, or a resin which is generally used as a material of a bolt. In addition, a heat insulating material may be interposed between the strut 12 and the support plate 11.

The flange portion 13 has a function of pressing columnar shape-memory alloy bodies 15 (which will be described below) such that the columnar shape-memory alloy bodies 15 extend to the movable plate 17 side when they are extensionally deformed. The flange portion 13 may be integrated with the strut 12 or may be able to be separated from the strut 12.

The thermal deformation part 14 includes a plurality (eight in FIG. 1B) of columnar shape-memory alloy bodies 15 and a thermally conductive part 16 covering the columnar shape-memory alloy bodies 15. The columnar shape-memory alloy bodies 15 are individually disposed at equal intervals in the circumferential direction of the strut 12. In addition, since the columnar shape-memory alloy bodies 15 are individually disposed at equal intervals in the circumferential direction of the strut 12, the change in shape as the thermal deformation part 14 becomes uniform. In FIG. 1, the columnar shape-memory alloy bodies 15 have a columnar shape, but the shapes of the columnar shape-memory alloy bodies 15 are not particularly limited. For example, a prismatic shape may be adopted.

The columnar shape-memory alloy bodies 15 are extensionally deformable in a direction along the direction (longitudinal direction of the strut 12) perpendicular to the surface of the support plate 11. That is, the columnar shape-memory alloy bodies 15 are compressively deformed at a temperature at which restoration forces of the columnar shape-memory alloy bodies 15 become equal to or smaller than a restoring force of the elastic part 18. If the columnar shape-memory alloy bodies 15 are heated to this temperature or higher, they are extensionally deformed in a direction along the direction (longitudinal direction of the strut 12) perpendicular to the surface of the support plate 11 and regain the original shapes. The temperature at which the columnar shape-memory alloy bodies 15 are deformed is not particularly limited. It is possible to set a wide range such as a range of $-270°$ C. to $250°$ C. The temperature at which the columnar shape-memory alloy bodies 15 are deformed can vary depending on a composition of a shape-memory alloy constituting the columnar shape-memory alloy bodies 15, heat treatment conditions when the columnar shape-memory alloy bodies 15 are manufactured, and compressive forces or the like applied to the columnar shape-memory alloy bodies 15.

Examples of a shape-memory alloy constituting the columnar shape-memory alloy bodies 15 include a Ni—Ti-based alloy, an Fe—Ti-based alloy, a Mn—Ti-based alloy, a Ti—Ni—Co-based alloy, a Ti—Ni—Cu-based alloy, a Cu—Zn—Al-based alloy, an Fe—Mn—Si-based alloy, and a Ti—Mo—Al-based alloy. The crystal structure of the shape-memory alloy may be a single-crystalline or a multi-crystal. Preferably, a single-crystalline is adopted. Compared to a multi-crystal shape-memory alloy, a single-crystalline shape-memory alloy has significant restorative distortion and high stability of the crystal structure. Therefore, the shape-memory ability can be maintained stably for a long period of time.

The thermally conductive part 16 uniformly applies heat to the columnar shape-memory alloy bodies 15. That is, since the columnar shape-memory alloy bodies 15 are covered with the thermally conductive part 16, they are heated uniformly.

Examples of a material of the thermally conductive part 16 can include a metal such as aluminum, copper, iron, or stainless steel. As illustrated in FIG. 1B, the thermally conductive part 16 has a columnar shape having a penetration hole through which the strut 12 passes. However, the shape of the thermally conductive part 16 is not particularly limited. For example, a prismatic shape may be adopted.

The movable plate 17 has a penetration hole through which the strut 12 passes, and the movable plate 17 can slide (move) along the strut 12. When the movable plate 17 moves along the strut 12, the support plate 11 and the movable plate 17 can switch between a contact state and a non-contact state. A heating element such as an electronic instrument or a heater (not illustrated) is generally disposed on a surface (upper surface in FIG. 1) of the movable plate 17 on a side opposite to the support plate 11. It is preferable that the movable plate 17 be thermally conductive. Examples of a material of the movable plate 17 can include a metal such as aluminum, copper, iron, or stainless steel.

The elastic part 18 is accommodated in an elastic part accommodation hole 17a formed on the surface of the movable plate 17 on the support plate 11 side. It is preferable that the elastic part accommodation hole 17a be formed to have a depth such that the support plate 11 and the movable plate 17 come into contact with each other when the elastic part 18 is in a pressurized and deformed state, and the support plate 11 and the movable plate 17 are in a non-contact state when the elastic part 18 is in a restored state.

The elastic part 18 is not particularly limited as long as it is elastically deformable. For example, a disk spring, a leaf spring, a compressive coil spring, or rubber can be used. In the present embodiment, a disk spring is used. The disk spring has a hole in the middle, and the strut 12 is inserted into this hole of the disk spring. In addition, the heat insulating material may be interposed between the elastic part 18 and the support plate 11.

Next, an operation state of the thermal actuator unit 1 of the present embodiment will be described.

In the thermal actuator unit 1 of the present embodiment, when the temperature of the movable plate 17 becomes equal to or lower than a temperature at which the restoration forces of the columnar shape-memory alloy bodies 15 become equal to or smaller than the restoring force of the elastic part 18, the temperature of the thermally conductive part 16 also becomes equal to or smaller than the temperature at which the restoration forces of the columnar shape-memory alloy bodies 15 become equal to or smaller than the restoring force of the elastic part 18. Therefore, as illustrated in FIG. 2A, the columnar shape-memory alloy bodies 15 have a compressively deformed length $L_{10}$.

On the other hand, if the temperature of the movable plate 17 rises due to heat generation of an electronic instrument (not illustrated) disposed in the movable plate 17, the temperature of the thermally conductive part 16 also rises. If the temperature of the thermally conductive part 16 becomes equal to or higher than a temperature at which the restoration forces of the columnar shape-memory alloy bodies 15 become equal to or larger than the restoring force of the elastic part 18, the columnar shape-memory alloy bodies 15 are extensionally deformed in a direction along the direction (longitudinal direction of the strut 12) perpendicular to the surface of the support plate 11 while causing the elastic part 18 to be elastically and compressively deformed due to the restoration force, and therefore, as illustrated in FIG. 2B, the columnar shape-memory alloy bodies 15 have a length $L_{11}$.

If the columnar shape-memory alloy bodies 15 are extensionally deformed, the thermally conductive part 16, the movable plate 17, and the support plate 11 move relatively closer to each other in accordance with the extensional deformation amount thereof. When the thermally conductive part 16, the movable plate 17, and the support plate 11 move relatively closer to each other, the elastic part 18 is compressively deformed. In this manner, if the temperature of the thermally conductive part 16 becomes equal to or higher than the temperature at which the restoration forces of the columnar shape-memory alloy bodies 15 become equal to or larger than the restoring force of the elastic part 18, the positional relationship between the movable plate 17 and the support plate 11 changes due to extensional deformation of the columnar shape-memory alloy bodies 15 and compressive deformation of the elastic part 18, such that they come into contact with each other.

Next, if temperature of the movable plate 17 deteriorates, the temperature of the thermally conductive part 16 also deteriorates. If the temperature of the thermally conductive part 16 becomes lower than the temperature at which the restoration forces of the columnar shape-memory alloy bodies 15 become equal to or smaller than the restoring force of the elastic part 18, extensional deformation forces of the columnar shape-memory alloy bodies 15 are weakened. Consequently, the elastic part 18 tends to regain the original shape due to the restoring force, and the thermally conductive part 16, the movable plate 17, and the support plate 11 move relatively away from each other. When the thermally conductive part 16, the movable plate 17, and the support plate 11 move relatively away from each other, the columnar shape-memory alloy bodies 15 are compressively deformed and have the compressively deformed length $L_{10}$ as illustrated in FIG. 2A. In this manner, if the temperature of the thermally conductive part 16 becomes lower than the temperature at which the restoration forces of the columnar shape-memory alloy bodies 15 become equal to or smaller than the restoring force of the elastic part 18, the positional relationship between the movable plate 17 and the support plate 11 changes due to deformation caused by the restoring force of the elastic part 18 and compressive deformation of the columnar shape-memory alloy bodies 15, such that they are away from each other.

According to the thermal actuator unit 1 of the first embodiment having a constitution as described above, since it has a comparatively simple constitution including the support plate 11, the strut 12, the thermal deformation part 14, the movable plate 17, and the elastic part 18, the size and the weight are easily reduced.

In addition, in the first embodiment, the thermal deformation part 14 includes a plurality of columnar shape-memory alloy bodies 15, and the plurality of columnar shape-memory alloy bodies 15 are individually disposed in the circumferential direction of the strut 12. Accordingly, the thermal deformation part 14 can be stably deformed under constant conditions. Therefore, according to the thermal actuator unit 1 of the present embodiment, it is possible to accurately change the positional relationship between the movable plate 17 and the support plate 11.

Moreover, in the first embodiment, the plurality of columnar shape-memory alloy bodies 15 are individually disposed at equal intervals. Accordingly, the thermal deformation part 14 can be uniformly deformed under constant conditions. Therefore, according to the thermal actuator unit 1 of the present embodiment, the movable plate 17 can be moved more accurately.

Furthermore, in the first embodiment, the plurality of columnar shape-memory alloy bodies 15 are individually and uniformly covered with the thermally conductive part 16. Accordingly, since the plurality of columnar shape-memory alloy bodies 15 are heated uniformly, the thermal deformation part 14 can be deformed more uniformly and stably under constant conditions. Therefore, according to the thermal actuator unit 1 of the present embodiment, the movable plate 17 can be moved much more accurately.

In addition, in the first embodiment, it is preferable that a shape-memory alloy constituting the columnar shape-memory alloy bodies 15 be a single-crystalline shape-memory alloy. Since a single-crystalline shape-memory alloy undergoes significant restorative distortion and has high stability of crystal structure, the shape-memory ability can be maintained more stably for a long period of time by using a single-crystalline shape-memory alloy. Therefore, according to the thermal actuator unit 1 of the present embodiment, for example, the movable plate 17 can be moved accurately for a long period of time even under a severe environment such as in outer space.

Moreover, the first embodiment has a constitution in which the elastic part accommodation hole 17a accommodating the elastic part 18 is provided on the surface of the movable plate 17 on the support plate 11 side such that the elastic part 18 is accommodated in the elastic part accommodation hole 17a when the elastic part 18 is in a pressurized and deformed state. Therefore, for example, the thermal actuator unit 1 according to the present embodiment can be used as a device for switching (heat switch) the movable plate 17 (heating element) and the heat exchanger (heat exchanger) to either a contact state (ON) or a non-contact state (OFF). The thermal actuator unit 1 of the present embodiment can be operated without utilizing electric energy. Accordingly, if the thermal actuator unit 1 of the present embodiment is used in a spacecraft such as an artificial satellite, a space probe, and a rover, the heating element and the heat exchanger can be brought into a non-contact state without utilizing electric energy under a low-temperature environment. Accordingly, since the heat of the heating element is unlikely to be released to the outside via the heat exchanger, power consumption of a heater can be reduced, and therefore an electric energy supply source for a battery, a dynamo, and the like can be reduced in weight.

Furthermore, in the first embodiment, the elastic part 18 is a disk spring having a hole, and the strut 12 is inserted into this hole of the disk spring. In this case, since the disk spring has a strong restoring force, when the temperature of the thermally conductive part 16 falls to lower than the temperature at which the restoration forces of the columnar shape-memory alloy bodies 15 become equal to or smaller than the restoring force of the elastic part 18, the thermally conductive part 16, the movable plate 17, and the support plate 11 can be moved reliably and relatively away from each other. Therefore, the thermal actuator unit 1 according to the present embodiment can be stably operated as a device for switching the heating element and the heat exchanger to either a contact state or a non-contact state.

In the first embodiment, the strut 12 is a bolt having a male screw, and the support plate 11 has a female screw on the surface. Since the strut 12 is fixed to the surface of the support plate 11 by screwing the male screw of the bolt and the female screw of the support plate 11 to each other, the strut 12 and the support plate 11 can be reliably fixed to each other. Therefore, the thermal actuator unit 1 according to the present embodiment can be more reliably and stably operated as a device for switching the heating element and the heat exchanger to either a contact state or a non-contact state.

In addition, in the thermal actuator unit 1 according to the present embodiment, the movable plate 17 is displaced in the direction perpendicular to the surface of the support plate 11 due to extension and contraction of the columnar shape-memory alloy bodies 15 caused by the thermal environment and elastic extension and contraction of the elastic part 18. Accordingly, for example, even when the same columnar shape-memory alloy bodies 15 are used, it is possible to change the temperature conditions under which the thermal actuator 10 operates, by adjusting a tightening torque (degree of compressive forces applied to the columnar shape-memory alloy bodies 15 and the elastic part 18 in the initial stage) when the strut 12 and the support plate 11 are screwed to each other.

Moreover, the thermal actuator 10 of the present embodiment has a simple constitution including the strut 12, the thermal deformation part 14, and the elastic part 18. Therefore, for example, in a device in which a substrate having an electronic instrument disposed therein and a heat exchanger are fixed to each other using a bolt, it can be mounted in a washer portion of the bolt.

Second Embodiment

Figure 3A:
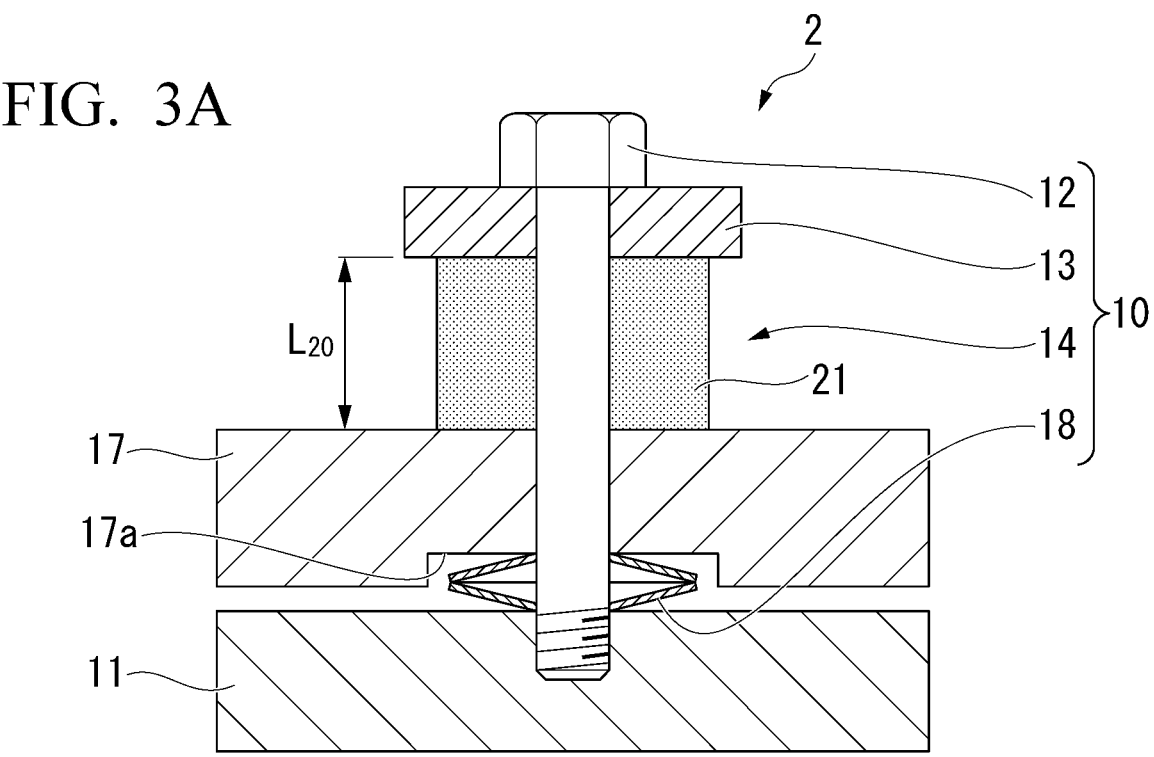
FIG. 3A is a view describing an operation state of a thermal actuator unit according to a second embodiment of the present invention and is a front cross-sectional view of the thermal actuator unit before operation.
Figure 3B:
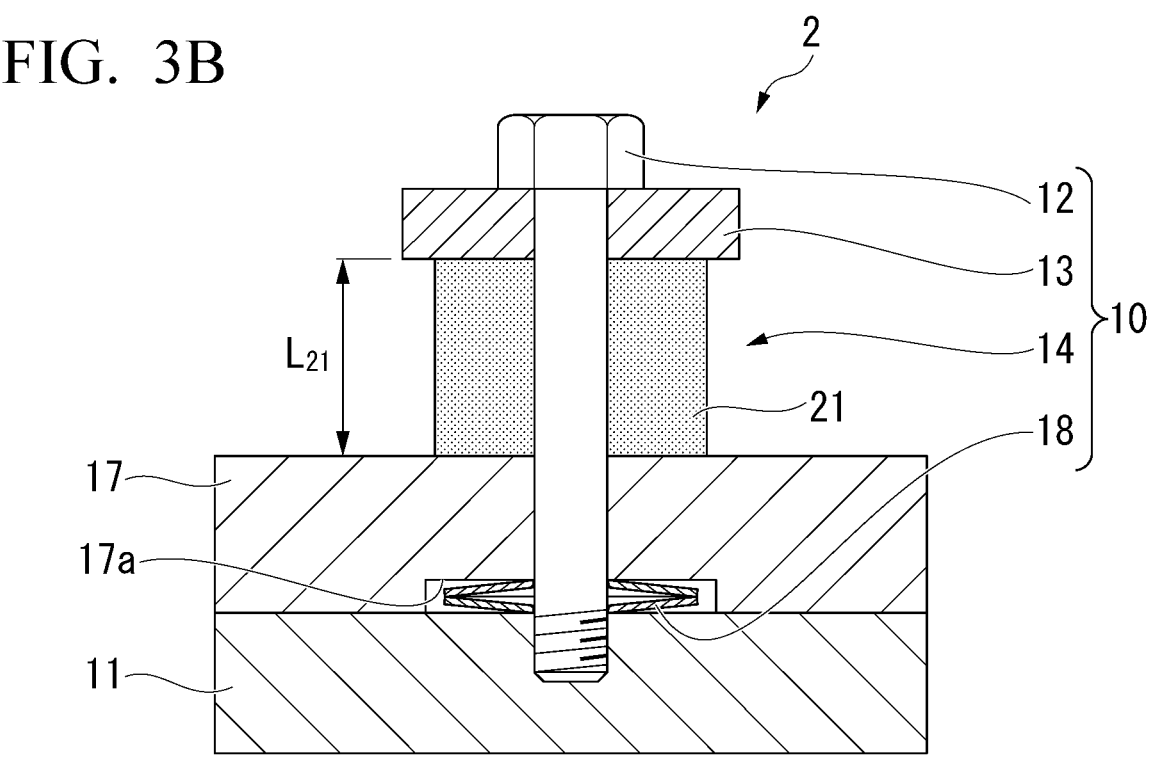
FIG. 3B is a view describing an operation state of the thermal actuator unit according to the second embodiment of the present invention and is a front cross-sectional view of the thermal actuator unit after operation.

FIGS. 3A and 3B are views describing operation states of a thermal actuator unit according to a second embodiment of the present invention. FIG. 3A is a front cross-sectional view of the thermal actuator unit before operation, and FIG. 3B is a front cross-sectional view of the thermal actuator unit after operation.

In this second embodiment, the same reference signs are applied to the same parts as the constituent elements in the first embodiment, and description thereof will be omitted. Only different points will be described.

In a thermal actuator unit 2 according to the second embodiment, the thermal deformation part 14 is constituted of a tubular shape-memory alloy body 21 having a penetration hole through which the strut 12 passes.

The material and the crystal structure of a shape-memory alloy constituting the tubular shape-memory alloy body 21 can be similar to those in the case of the columnar shape-memory alloy bodies 15 of the thermal actuator unit 1 according to the first embodiment.

In the thermal actuator unit 2 of the present embodiment, when the temperature of the movable plate 17 is equal to or lower than the temperature at which a restoration force of the tubular shape-memory alloy body 21 becomes equal to or smaller than the restoring force of the elastic part 18, the tubular shape-memory alloy body 21 has a compressively deformed length $L_{20}$ as illustrated in FIG. 3A.

On the other hand, if the temperature of the movable plate 17 rises due to heat generation of an electronic instrument (not illustrated) disposed in the movable plate 17, the temperature of the tubular shape-memory alloy body 21 also rises. If the temperature of the tubular shape-memory alloy body 21 becomes equal to or higher than the temperature at which the restoration force thereof becomes equal to or larger than the restoring force of the elastic part 18, the tubular shape-memory alloy body 21 is extensionally deformed in a direction along the direction (longitudinal direction of the strut 12) perpendicular to the surface of the support plate 11 due to the restoration force and has a length $L_{21}$ as illustrated in FIG. 3B.

If the tubular shape-memory alloy body 21 is extensionally deformed, the movable plate 17 and the support plate 11 move relatively closer to each other in accordance with the extensional deformation amount thereof. When the movable plate 17 and the support plate 11 move relatively closer to each other, the elastic part 18 is compressively deformed. In this manner, if the temperature of the tubular shape-memory alloy body 21 becomes equal to or higher than the temperature at which the restoration force thereof becomes equal to or larger than the restoring force of the elastic part 18, the positional relationship between the movable plate 17 and the support plate 11 changes due to extensional deformation of the tubular shape-memory alloy body 21 and compressive deformation of the elastic part 18, such that they come into contact with each other.

Next, if the temperature of the movable plate 17 deteriorates, the temperature of the tubular shape-memory alloy body 21 also deteriorates. If the temperature of the tubular shape-memory alloy body 21 becomes lower than the temperature at which the restoration force thereof becomes equal to or smaller than the restoring force of the elastic part, the extensional deformation force of the tubular shape-memory alloy body 21 is weakened. Consequently, the elastic part 18 tends to regain the original shape due to the restoration force, and the movable plate 17 and the support plate 11 move relatively away from each other. When the movable plate 17 and the support plate 11 move relatively away from each other, the tubular shape-memory alloy body 21 is compressively deformed and has the compressively deformed length $L_{20}$ as illustrated in FIG. 3A. In this manner, if the temperature of the tubular shape-memory alloy body 21 becomes lower than the temperature at which the restoration force thereof becomes equal to or smaller than the restoring force of the elastic part 18, the positional relationship between the movable plate 17 and the support plate 11 changes due to deformation caused by the restoring force of the elastic part 18 and compressive deformation of the tubular shape-memory alloy body 21, such that they are away from each other.

According to the thermal actuator unit 2 of the second embodiment having a constitution as described above, the thermal deformation part 14 is constituted of the tubular shape-memory alloy body 21 having a penetration hole through which the strut 12 passes, and the thermal deformation part 14 has a simplified structure. Therefore, the size and the weight are easily reduced. In the thermal actuator unit according to the second embodiment, a head portion of the strut 12 may be used as a flange in place of the flange portion 13.

Third Embodiment

Figure 4A:
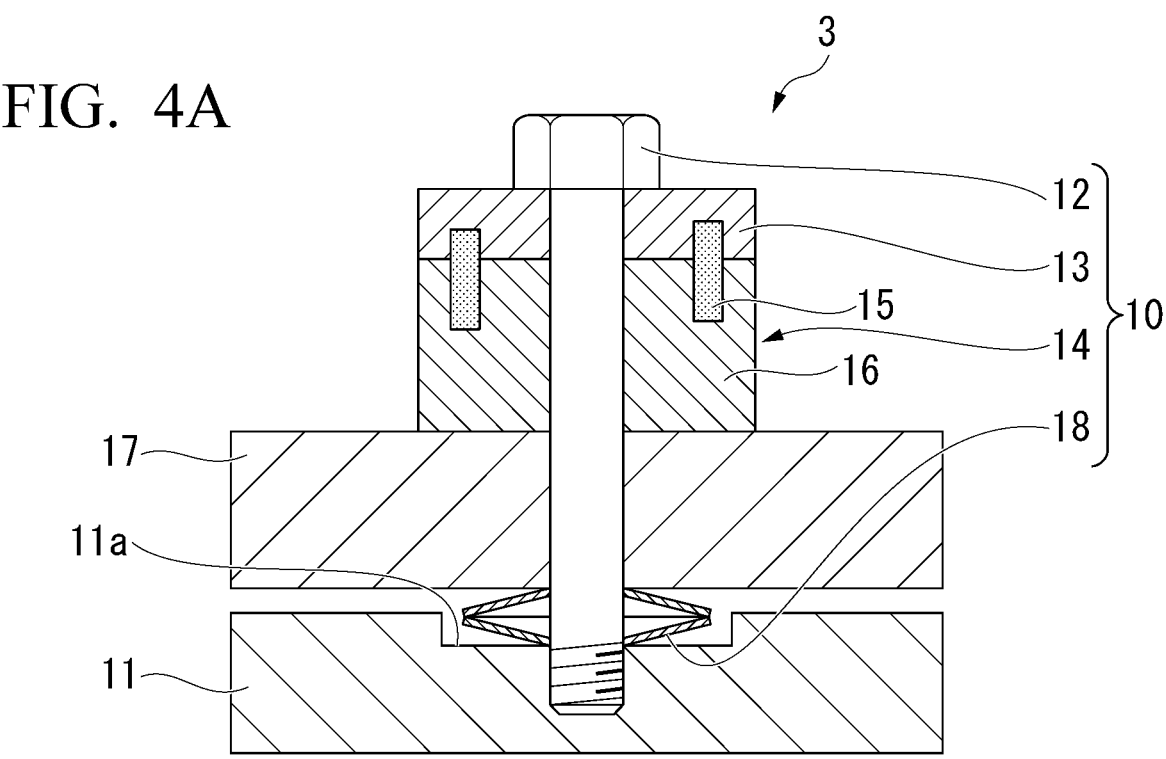
FIG. 4A is a view describing an operation state of a thermal actuator unit according to a third embodiment of the present invention and is a front cross-sectional view of the thermal actuator unit before operation.
Figure 4B:
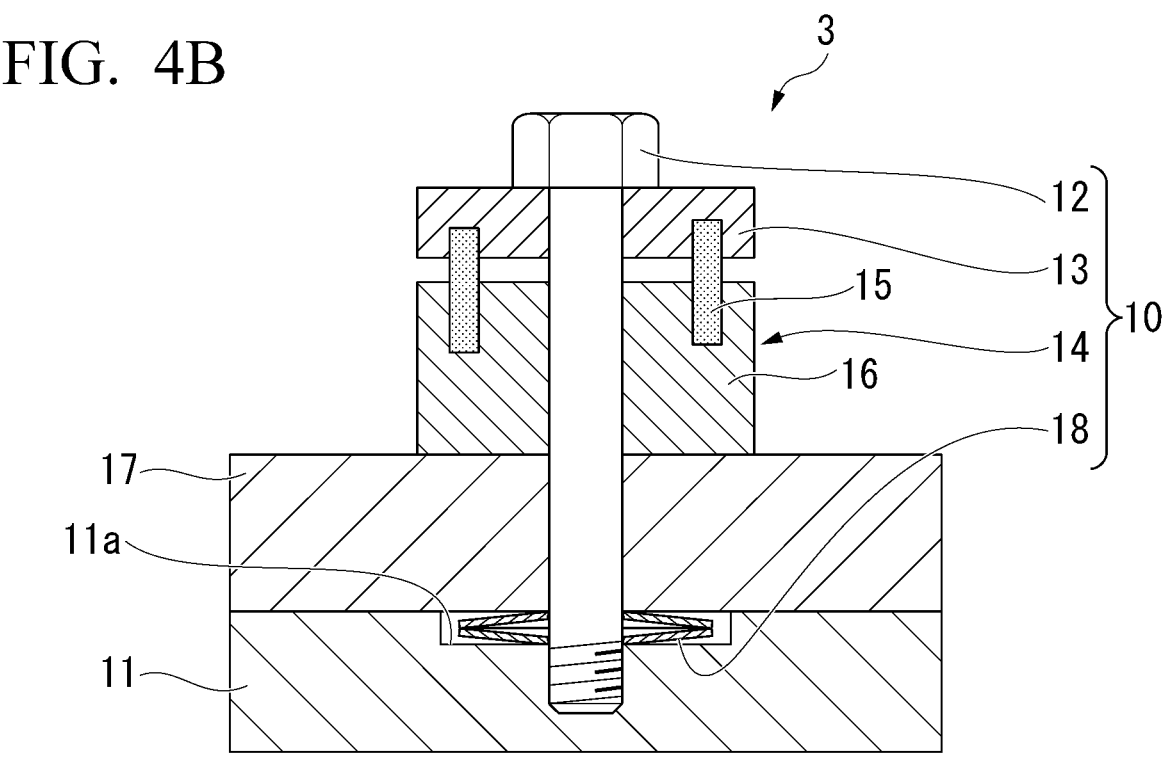
FIG. 4B is a view describing an operation state of the thermal actuator unit according to the third embodiment of the present invention and is a front cross-sectional view of the thermal actuator unit after operation.

FIGS. 4A and 4B are views describing operation states of a thermal actuator unit according to a third embodiment of the present invention. FIG. 4A is a front cross-sectional view of the thermal actuator unit before operation, and FIG. 4B is a front cross-sectional view of the thermal actuator unit after operation.

In this third embodiment, the same reference signs are applied to the same parts as the constituent elements in the first embodiment, and description thereof will be omitted. Only different points will be described.

In a thermal actuator unit 3 according to the third embodiment, the elastic part 18 is accommodated in an elastic part accommodation hole 11a formed on a surface of the support plate 11 on the movable plate 17 side. The elastic part accommodation hole 11a is formed to have a depth such that the support plate 11 and the movable plate 17 come into contact with each other when the elastic part 18 is in a pressurized and deformed state, and the support plate 11 and the movable plate 17 are in a non-contact state when the elastic part 18 is in a restored state.

In the thermal actuator unit 3 according to the third embodiment, since the elastic part 18 is accommodated in the elastic part accommodation hole 11a formed on the surface of the support plate 11 on the movable plate 17 side, there is no need to form a hole for accommodating the elastic part 18 in the movable plate 17. Accordingly, the strength of the movable plate 17 can be enhanced. Therefore, the thermal actuator unit 3 according to the present embodiment is suitable for a case where an electronic instrument having a comparatively large mass or a material difficult to be worked is disposed in the movable plate 17.

A hole for accommodating the elastic part 18 may be formed in each of the support plate 11 and the movable plate 17. In this case, the total depth of the holes individually formed in the support plate 11 and the movable plate 17 is set to a depth such that the support plate 11 and the movable plate 17 come into contact with each other when the elastic part 18 is in a pressurized and deformed state, and the support plate 11 and the movable plate 17 are in a non-contact state when the elastic part 18 is in a restored state.

Fourth Embodiment

Figure 5:
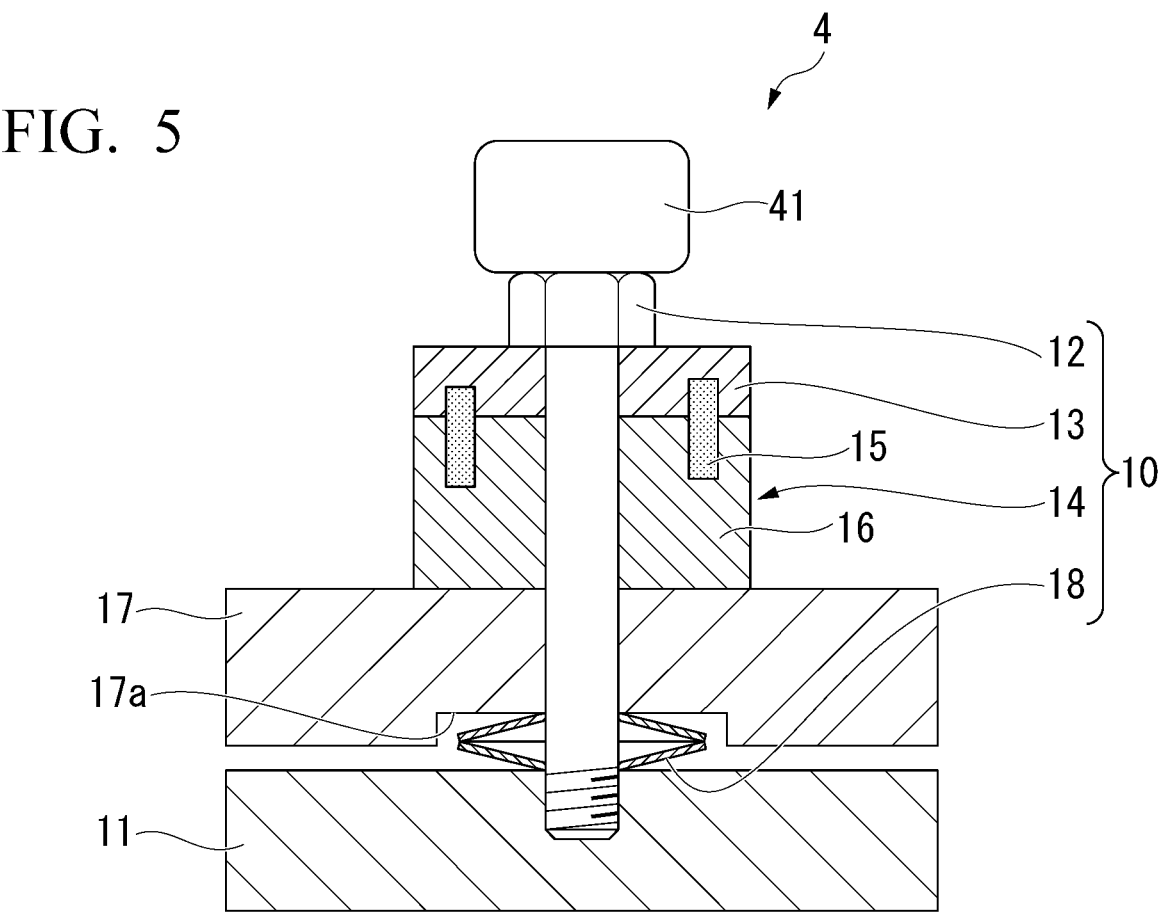
FIG. 5 is a front cross-sectional view of a thermal actuator unit according to a fourth embodiment of the present invention.

FIG. 5 is a front cross-sectional view of a thermal actuator unit according to a fourth embodiment of the present invention.

In this fourth embodiment, the same reference signs are applied to the same parts as the constituent elements in the first embodiment, and description thereof will be omitted. Only different points will be described.

A thermal actuator unit 4 according to the fourth embodiment further includes a tightening torque adjusting part 41 which adjusts the tightening torque when the strut 12 (male screw of the bolt) and the support plate 11 (female screw) are screwed to each other. For example, the tightening torque adjusting part 41 includes a motor which can be controlled by radio, and a value of the tightening torque can be set from a remote place.

The temperature condition under which the thermal actuator 10 operates can be changed depending on the tightening torque (degree of compressive forces applied to the columnar shape-memory alloy bodies 15 and the elastic part 18 in the initial stage) when the strut 12 and the support plate 11 are screwed to each other. Therefore, in the thermal actuator unit 4 according to the present embodiment, the temperature condition under which the thermal actuator 10 operates can be changed from a remote place.

Fifth Embodiment

Figure 6A:
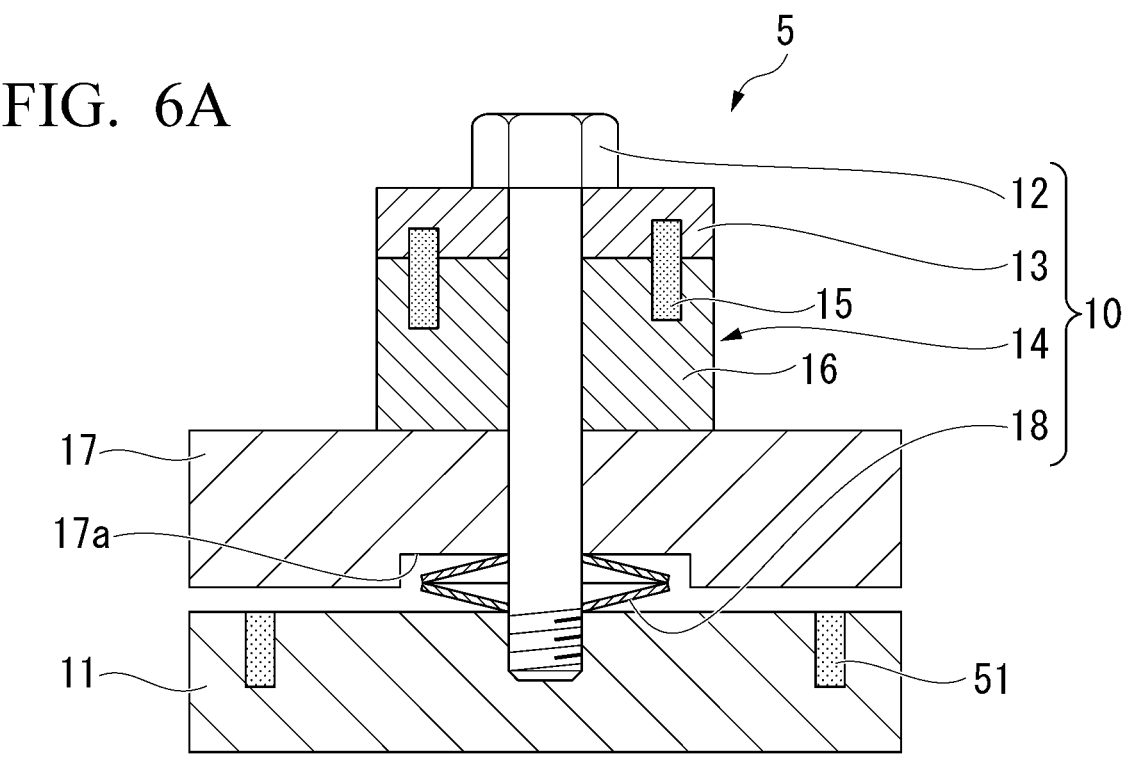
FIG. 6A is a view describing a thermal actuator unit according to a fifth embodiment of the present invention and is a front cross-sectional view of the thermal actuator unit before a contact restraining part is operated.
Figure 6B:
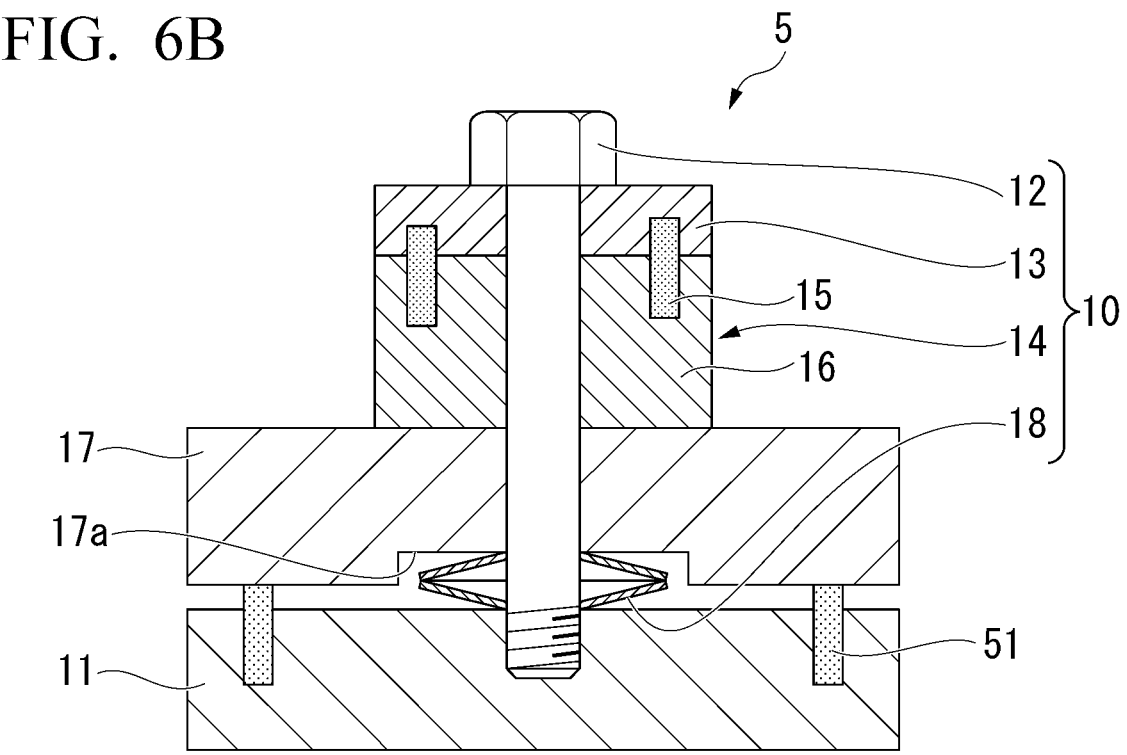
FIG. 6B is a view describing the thermal actuator unit according to the fifth embodiment of the present invention and is a front cross-sectional view of the thermal actuator unit after the contact restraining part is operated.

FIGS. 6A and 6B are views describing a thermal actuator unit according to a fifth embodiment of the present invention. FIG. 6A is a front cross-sectional view of the thermal actuator unit before a contact restraining part is operated, and FIG. 6B is a front cross-sectional view of the thermal actuator unit after the contact restraining part is operated.

In this fifth embodiment, the same reference signs are applied to the same parts as the constituent elements in the first embodiment, and description thereof will be omitted. Only different points will be described.

In a thermal actuator unit 5 according to the fifth embodiment, columnar contact restraining parts 51 are buried on the surface of the support plate 11 on the movable plate 17 side. The contact restraining parts 51 has a function of expanding in the longitudinal direction when the temperature of the support plate 11 becomes excessively high, such that the support plate 11 and the movable plate 17 are prevented from coining into direct contact with each other. A shape-memory alloy can be used as a material of the contact restraining parts 51.

If the temperature of the support plate 11 becomes excessively high, there is concern that heat of the support plate 11 may move to the movable plate 17 and an electronic instrument disposed in the movable plate 17 may be damaged due to the heat when the support plate 11 and the movable plate 17 come into contact with each other. When the contact restraining parts 51 provided in the support plate 11, it is possible to restrain contact between the support plate 11 and the movable plate 17 at an excessively high temperature.

Sixth Embodiment

Figure 7A:
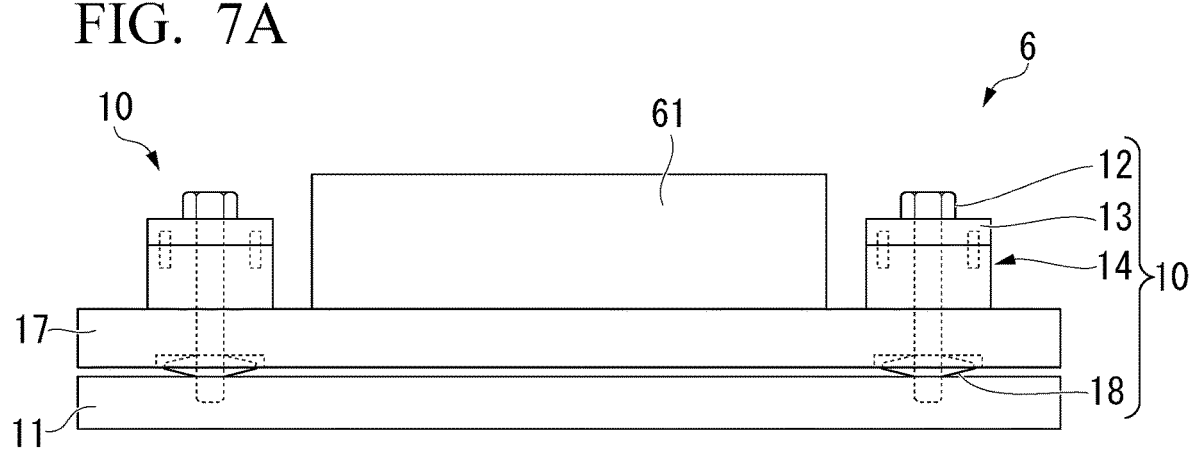
FIG. 7A is a view describing a constitution of a thermal actuator unit according to a sixth embodiment of the present invention.
Figure 7B:
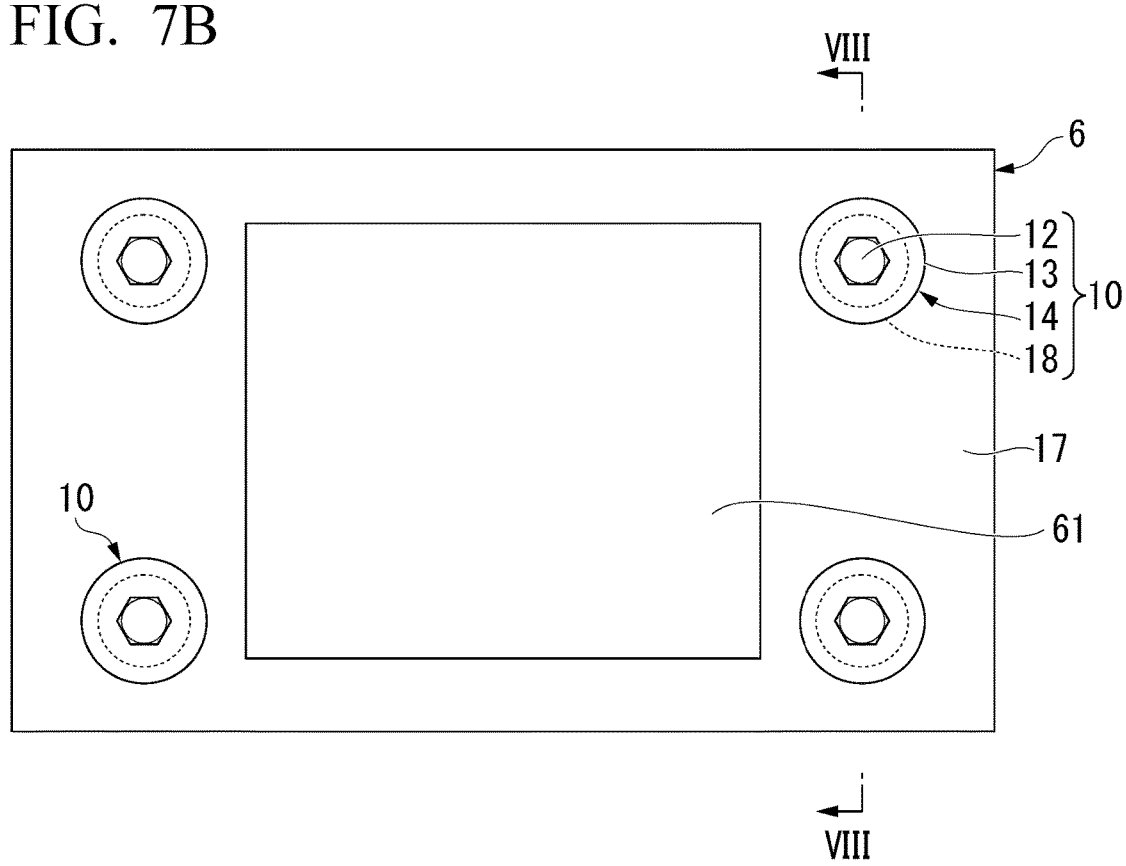
FIG. 7B is a view describing the constitution of the thermal actuator unit according to the sixth embodiment of the present invention and is a plan view of the thermal actuator unit.
Figure 8:
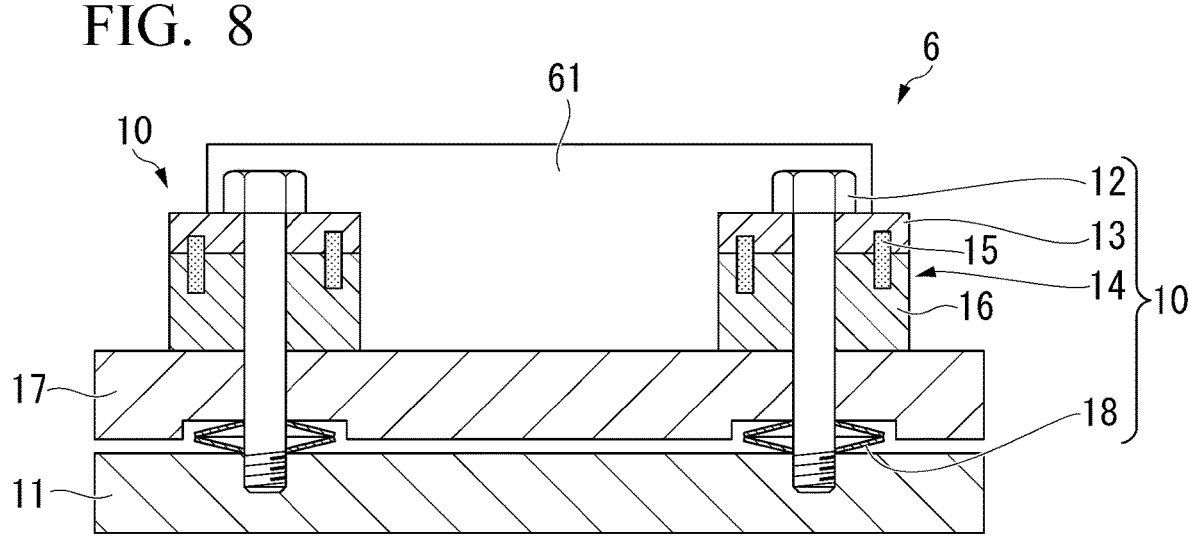
FIG. 8 is a cross-sectional view taken along line VIII-VIII in FIG. 7B.

FIGS. 7A, 7B, and 8 are views describing a constitution of a thermal actuator unit according to a sixth embodiment of the present invention. FIG. 7A is a front view of the thermal actuator unit, and FIG. 7B is a plan view of the thermal actuator unit. FIG. 8 is a cross-sectional view taken along line VIII-VIII in FIG. 7B.

In this sixth embodiment, the same reference signs are applied to the same parts as the constituent elements in the first embodiment, and description thereof will be omitted. Only different points will be described.

A thermal actuator unit 6 has four thermal actuators 10 including the strut 12, the thermal deformation part 14, and the elastic part 18. These four thermal actuators 10 are individually provided in the vicinity of four corners of the thermal actuator unit 6. A heating element 61 is disposed on the surface of the movable plate 17 on a side opposite to the support plate 11.

According to the thermal actuator unit 6 of the sixth embodiment having a constitution as described above, since the movable plate is moved using a plurality of thermal actuators 10, the movable plate 17 can be moved accurately. In addition, since each of the thermal actuators 10 has a comparatively simple constitution including the support plate 11, the strut 12, the thermal deformation part 14, the movable plate 17, and the elastic part 18, the size and the weight are easily reduced.

Hereinabove, embodiments of the present invention have been described with reference to the drawings. However, the present invention is not limited to the foregoing embodiments. The shapes and the combinations of the constituent parts in the embodiments described above are merely examples, and various changes can be made based on requirement of design or the like within a range not departing from the gist of the present invention.

In the present embodiment, the thermal actuator unit has been described as a device (heat switch) for switching a support plate and a movable plate between the contact state (ON) and the non-contact state (OFF). However, for example, the thermal actuator unit of the present invention can be utilized as a positioning device using the movable plate 17 as a movable stage.

In a case where it is utilized as a positioning device, it is preferable that a heater be disposed in the thermal deformation part 14 and heat be applied to the shape-memory alloy. In this case, the movable plate 17 does not have to be thermally conductive. In addition, in a case where it is utilized as a positioning device, the support plate and the movable plate are not particularly required to be in the contact state. Therefore, an elastic part accommodation hole for accommodating an elastic part does not have to be provided on the surface of the support plate on the movable plate 17 side or the surface of the movable plate on the support plate side.

In addition, in the thermal actuator unit of the present embodiment, the thermal deformation part is fixed to a side of the movable plate (first member) opposite to the support plate (second member) side due to the flange portion of the strut fixed to the surface of the support plate. However, as long as the shape-memory alloy of the thermal deformation part can be extensionally deformed to the movable plate side, the method of fixing the thermal deformation part is not particularly limited.

Moreover, in the thermal actuator unit of the present embodiment, the thermal deformation part is disposed in only the movable plate (first member). However, the thermal deformation part may also be disposed on a side of the support plate (second member) opposite to the movable plate side. In this case, since both the movable plate and the support plate move relatively due to extensional deformation caused by the shape-memory alloy of the thermal deformation part, switching between the non-contact state (OFF) and the contact state (ON) can be performed more reliably.

The thermal actuator unit and the thermal actuator of the present embodiment are not limited to aerospace purposes. Needless to say, they can be applied to a heating element, a heat exchanger, or the like for ground purposes.

EXAMPLES

Example 1

As illustrated in FIG. 7, the thermal actuator unit 6 including thermal actuators in the vicinity of four corners was produced.

Aluminum alloy sheets were used as the support plate 11 and the movable plate 17. A heater was disposed as the heating element 61 in the movable plate 17.

A screw (M4) with a flange was used as the strut 12.

As the thermal deformation part 14, a part including six single-crystal columnar shape-memory alloy bodies 15 (size: φ1.3 mm, length: 9 mm, and transformation temperature: 20° C.) and the aluminum alloy thermally conductive part 16 was used. The six columnar shape-memory alloy bodies 15 were individually disposed at equal intervals.

A disk spring (SSRBN14-A) was used as the elastic part 18.

The strut 12 was fixed to the support plate 11 with a force having a torque of 0.6 Nm (25° C.).

Figure 9:
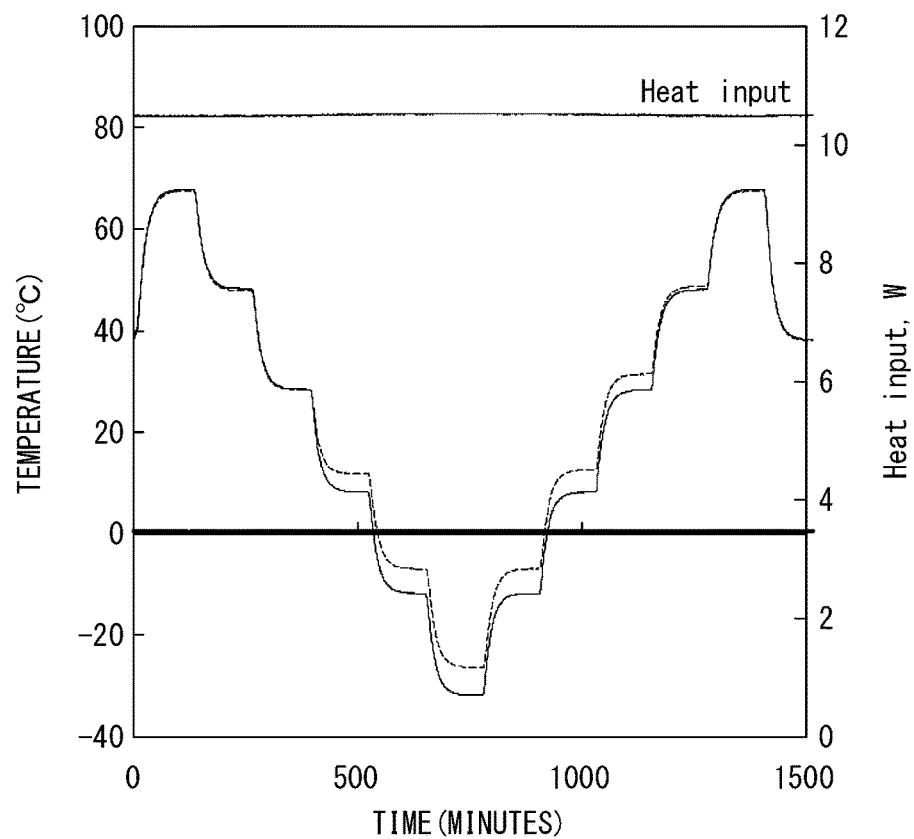
FIG. 9 is a graph showing thermal behavior of a thermal actuator unit produced in Example 1.

The produced thermal actuator unit 6 was disposed inside a low-temperature thermostatic tank. While the temperature inside the low-temperature thermostatic tank was maintained at temperatures in the order of 60° C., 40° C., 20° C., 0° C., −20° C., −40° C., −20° C., 0° C., 20° C., 40° C., and 60° C. for 120 minutes for each temperature, a test of measuring the temperatures of the support plate 11 and the movable plate 17 was performed. Power of approximately 10 W was applied to the heating element 61 (heater) during the test. FIG. 9 shows results of the test.

In FIG. 9, the horizontal axis indicates the time, and the vertical axis indicates the temperature. The solid line is the temperature of the support plate 11, and the dotted line is the temperature of the movable plate 17. In addition, in FIG. 9, a heat input is the power applied to the heating element 61.

When the solid line and the waved line are converged, it is conceivable that the support plate 11 and the movable plate 17 are in the contact state. On the other hand, when the solid line and the waved line are diverged, it is conceivable that the support plate 11 and the movable plate 17 are in the non-contact state.

From the results of FIG. 9, it is understood that when the temperature inside the low-temperature thermostatic tank is sequentially lowered from 60° C., the support plate 11 and the movable plate 17 are in the non-contact state at the time when the temperature has become 0° C. If the support plate 11 and the movable plate 17 are in the non-contact state, the temperature of the support plate 11 drops significantly in accordance with a drop in ambient temperature. On the other hand, in the movable plate 17, the amount of a temperature drop due to a drop in ambient temperature is reduced due to heat supplied from the heater.

In addition, from the results of FIG. 9, it is understood that when the temperature inside the low-temperature thermostatic tank is sequentially raised from −40° C., the support plate 11 and the movable plate 17 are in the contact state at the time when the temperature has become 40° C.

If the support plate 11 and the movable plate 17 are in the contact state, heat from the heater supplied to the movable plate 17 is diffused in the support plate 11. Therefore, the temperatures of the support plate 11 and the movable plate 17 become the same as each other.

From the results described above, it has been confirmed that the heat change amount of the movable plate with respect to the ambient temperature can be reduced by using the thermal actuator unit 6 of the present Example.

INDUSTRIAL APPLICABILITY

A thermal actuator unit of the present invention has a constitution in which a size and a weight are easily reduced and a support plate of a heat exchanger or the like and a movable plate serving as a heating element can be brought into contact with each other over a wide area. In addition, a thermal actuator of the present invention can be advantageously used as a drive source of the thermal actuator unit.

REFERENCE SIGNS LIST 1, 2, 3, 4, 5, 6 Thermal actuator unit
10 Thermal actuator
11 Support plate
11a Elastic part accommodation hole
12 Strut
13 Flange portion 14 Thermal deformation part
15 Columnar shape-memory alloy body
16 Thermally conductive part
17 Movable plate
17a Elastic part accommodation hole
18 Elastic part
21 Tubular shape-memory alloy body
41 Tightening torque adjusting part
51 Contact restraining part
61 Heating element

The invention claimed is:

1. A thermal actuator unit comprising:
a first member;
a second member;
an elastic part which is disposed between the first member and the second member;
a thermal deformation part which is disposed on a side of the first member opposite to a side with the second member and has a shape-memory alloy to be deformed to the side with the second member due to heat;
a strut which extends in the direction perpendicular to a surface of the second member and in which one end portion is fixed to the surface of the second member; and
a flange portion is provided in the other end portion, wherein
the shape-memory alloy is extensionally deformable in a direction along a direction perpendicular to the surface of the second member due to heat,
the first member has a penetration hole through which the strut passes and is slidable along the strut,
the thermal deformation part includes a plurality of columnar shape-memory alloy bodies, and
the plurality of columnar shape-memory bodies are individually disposed in a circumferential direction of the strut.

2. The thermal actuator unit according to claim 1, wherein the plurality of columnar bodies are covered with a thermally conductive part.

3. The thermal actuator unit according to claim 1, wherein the strut is a bolt having a male screw, and the second member has a female screw on the surface and has a tightening torque adjusting part used when the male screw of the bolt and the female screw of the second member are screwed to each other.

4. The thermal actuator unit according to claim 1, wherein the elastic part is a disk spring, and the strut is inserted into a hole of the disk spring.

5. The thermal actuator unit according to claim 1, wherein the shape-memory alloy is a single-crystalline shape-memory alloy.

6. The thermal actuator unit according to claim 1, wherein an elastic part accommodation hole is formed on at least one of a surface of the first member on the side with the second member and a surface of the second member on a side with the first member.

7. A thermal actuator comprising:
an elastic part which is disposed between a first member and a second member;
a thermal deformation part which is disposed on a side of the first member opposite to a side with the second member and has a shape-memory alloy to be deformed to the side with the second member due to heat;
a strut, one end portion of which is fixable to a surface of the second member; and
a flange portion is provided in another end portion of the strut,
wherein
the elastic part and the thermal deformation part have a penetration hole through which the strut passes,
the shape-memory alloy is extensionally deformable in a direction along a longitudinal direction of the strut due to heat,
the thermal deformation part includes a plurality of columnar shape-memory alloy bodies, and
the plurality of columnar shape-memory bodies are individually disposed in a circumferential direction of the strut.

8. A thermal actuator unit comprising:
a first plate having a top surface and a bottom surface;
a second plate having a top surface and a bottom surface;
an elastic part which is disposed between the bottom surface of the first plate and the top surface of the second plate, the elastic part being configured to press the bottom surface of the first plate and the top surface of the second plate away from each other and retain a space therebetween; and
a thermal deformation part that is disposed on a side of the top surface of the first plate and has a shape-memory alloy to be deformed to a side with the second plate due to heat so that the bottom surface of the first plate and the top surface of the second plate come in contact, wherein
an elastic part accommodation hole is formed on the bottom surface of the first plate or the top surface of the second plate, and
the elastic part is fully accommodated in the elastic part accommodation hole when the bottom surface of the first plate and the top surface of the second plate come in contact.

* * * * *